(12) United States Patent
Sonntag

(10) Patent No.: US 10,356,603 B2
(45) Date of Patent: Jul. 16, 2019

(54) PROFILE SERVER FOR PROVIDING A COMMUNICATION PROFILE FOR COMMUNICATION VIA A COMMUNICATION NETWORK

(71) Applicant: Deutsche Telekom AG, Bonn (DE)

(72) Inventor: Thomas Sonntag, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/682,561

(22) Filed: Aug. 22, 2017

(65) Prior Publication Data

US 2018/0063698 A1    Mar. 1, 2018

(30) Foreign Application Priority Data

Aug. 24, 2016   (EP) .................................... 16185509

(51) Int. Cl.
| | |
|---|---|
| *H04W 8/18* | (2009.01) |
| *H04W 4/50* | (2018.01) |
| *H04L 29/08* | (2006.01) |
| *H04W 8/24* | (2009.01) |
| *H04W 8/26* | (2009.01) |

(52) U.S. Cl.
CPC ............ *H04W 8/183* (2013.01); *H04L 67/30* (2013.01); *H04L 67/303* (2013.01); *H04W 4/50* (2018.02); *H04W 8/245* (2013.01); *H04L 67/34* (2013.01); *H04W 8/265* (2013.01)

(58) Field of Classification Search
CPC ........ H04W 4/50; H04W 8/183; H04L 67/303
USPC ..... 455/422.1, 411, 414.1, 410, 67.11, 452.1
See application file for complete search history.

(56) References Cited

U.S. PATENT DOCUMENTS

| | | | |
|---|---|---|---|
| 2009/0098855 A1* | 4/2009 | Fernandez .......... | H04M 1/6075 455/410 |
| 2015/0350881 A1* | 12/2015 | Weiss .................... | H04W 8/205 455/558 |
| 2016/0249203 A1* | 8/2016 | Mazali .................. | H04W 8/205 |

FOREIGN PATENT DOCUMENTS

| | | |
|---|---|---|
| EP | 2747466 A1 | 6/2014 |
| WO | WO 2015052422 A1 | 4/2015 |

* cited by examiner

*Primary Examiner* — John J Lee
(74) *Attorney, Agent, or Firm* — Leydig, Voit & Mayer, Ltd.

(57) ABSTRACT

A profile server provides a communication profile for communication via a communication network. The communication profile is assigned to a subscriber identity module. The profile server includes: a database, configured to store a plurality of subscriptions comprising a plurality of identifications, wherein an identification is assigned to each subscription, and wherein each subscription comprises subscription data for generating a communication profile; a communication interface, configured to receive an identification from the subscriber identity module; and a processor, configured to call up a subscription from the database, wherein the subscription is assigned to the received identification, to extract subscription data from the called up subscription, and to generate the communication profile based on the extracted subscription data. The communication interface is further configured to send the generated communication profile to the subscriber identity module in order to provide the communication profile for communication via the communication network.

13 Claims, 5 Drawing Sheets

PROFILE SERVER FOR PROVIDING A COMMUNICATION PROFILE FOR COMMUNICATION VIA A COMMUNICATION NETWORK

CROSS-REFERENCE TO RELATED APPLICATIONS

Priority is claimed to European Patent Application No. EP 16185509.3, filed on Aug. 24, 2016, the entire disclosure of which is hereby incorporated by reference herein.

FIELD

The present invention relates to the field of communication technology, in particular to the provision of a communication profile for communication via a communication network using a subscriber identity module.

BACKGROUND

Subscriber identity modules, for example SIM (Subscriber Identity Module) cards, are usually produced in several steps.

ICCIDs (Integrated Circuit Card Identifiers) and IMSIs (International Mobile Subscriber Identities), which are also referred to as "resources" are first selected. Keys, for example authentication keys, PINS (Personal Identification Numbers), PUKs (Personal Unblocking Keys) and OTA (Over-the-Air) keys, are then generated.

The resources and keys, which are also referred to as "subscriptions", are then created in back-end systems of a network operator, for example an HLR (Home Location Register), an accounting system and/or OTA (Over-the-Air) servers. The subscriber identity modules are then physically produced and shipped.

Since it takes a certain amount of time to create and in particular produce the subscriber identity modules, the steps described are normally carried out in batches typically comprising several hundreds to several thousands of subscriber identity modules. The batches produced are then directly shipped to wholesale customers or put in to storage. These are then typically delivered to end customers or points of sale from a warehouse in small numbers, for example between 1 and 100 items.

This storage is associated with several disadvantages. Firstly, it is costly, and secondly, the subscriber identity modules in question have to be destroyed or repaired with a great deal of complexity if the stored goods prove to be faulty or obsolete.

These disadvantages can be alleviated by the minimum storage time nmin being selected to be as short as possible. However, during production, it is not possible to just select nmin to be as short as you want for several reasons. Firstly, the physical production requires a certain amount of time, and secondly it takes a certain amount of time to create the subscriptions in the back-end systems.

Currently, communication profiles for eSIMs (embedded Subscriber Identity Modules) are also produced in the same way as the production of SIM cards described.

SUMMARY

In an exemplary embodiment, the present invention provides a profile server for providing a communication profile for communication via a communication network. The communication profile is assigned to a subscriber identity module. The profile server includes: a database, configured to store a plurality of subscriptions comprising a plurality of identifications, wherein an identification is assigned to each subscription, and wherein each subscription comprises subscription data for generating a communication profile; a communication interface, configured to receive an identification from the subscriber identity module; and a processor, configured to call up a subscription from the database, wherein the subscription is assigned to the received identification, to extract subscription data from the called up subscription, and to generate the communication profile based on the extracted subscription data extracted. The communication interface is further configured to send the generated communication profile to the subscriber identity module in order to provide the communication profile for communication via the communication network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
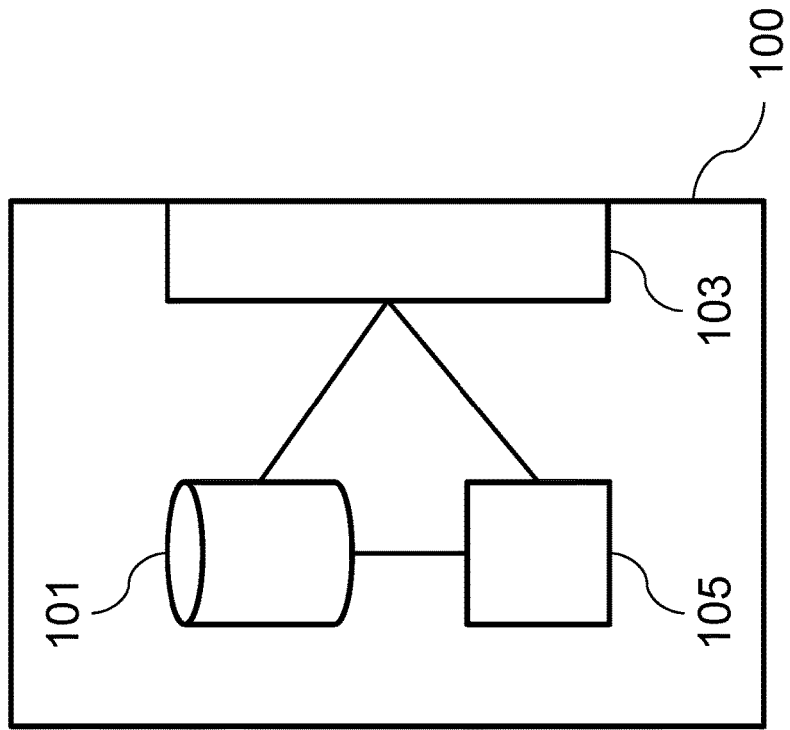
FIG. 1 is a schematic diagram of a profile server for providing a communication profile for communication via a communication network.

Exemplary embodiment of the present invention provide a communication profile for a subscriber identity module in an efficient and flexible manner.

In an exemplary embodiment, the present invention provides a profile server that is configured to generate a communication profile for a subscriber identity module just in time (JIT). The communication profile is generated from subscription data here, it being possible for the communication profile to be generated just in time, directly before the communication profile is transferred to the subscriber identity module. A network entity can be used to provide subscriptions, in which entity subscriptions of different subscription types can be pre-stored and transferred to the profile server when necessary. A subscription is assigned to the subscriber identity module using an identification, which can be a subscriber identity identification or a token, for example.

As a result, the above-described disadvantages of the conventional production can be avoided and providing a communication profile can be achieved in an efficient and flexible manner.

According to a first aspect, the invention relates to a profile server for providing a communication profile for communication via a communication network, the communication profile being assigned to a subscriber identity module. The profile server comprises a database, in which a plurality of subscriptions comprising a plurality of identifications are stored, an identification being assigned to each subscription, and each subscription comprising subscription data for generating a communication profile. The profile server further comprises a communication interface, which is configured to receive an identification from the subscriber identity module. The profile server also comprises a processor, which is configured to call up a subscription from the database, which subscription is assigned to the identification received, to extract subscription data from the subscription called up and to generate the communication profile on the basis of the subscription data extracted. The communication interface is also configured to send the communication profile generated to the subscriber identity module in order to provide the communication profile for communication via the communication network. This is advantageous in that providing a communication profile for a subscriber identity module can be achieved in an efficient and flexible manner. The profile server can be an SMDP (Simple Multimedia service Description Protocol) server or an SMDP+ server, for example.

The subscriber identity module can be a SIM, which can be formed by a SIM card, for example, or as an eSIM profile. An eSIM profile can form the implementation of a SIM. An eUICC can contain a plurality of eSIM profiles as hardware components. The communication profile can be generated by the processor using known procedures.

According to one embodiment, the processor is configured to compare the identification received with the plurality of identifications. This is advantageous in that the subscription can be efficiently called up from the database.

According to one embodiment, the subscription data comprise: an International Mobile Subscriber Identity (IMSI), an authentication key (Ki) and/or an Integrated Circuit Card Identifier (ICCID). This is advantageous in that data can be taken into consideration when generating the communication profile, which data are uniquely assigned to the subscriber identity module.

According to one embodiment, profile data for generating a communication profile are also assigned to each subscription, the processor also being configured to generate the communication profile on the basis of the profile data assigned to the subscription called up. This is advantageous in that the communication profile can be efficiently generated. The plurality of subscriptions and the respective profile data can be managed and provided independently of one another. The respective profile data can be pre-stored in the database.

According to one embodiment, the profile data comprise: a software application of the subscriber identity module, information relating to a software application of the subscriber identity module, a software code, a file system for the subscriber identity module, or information relating to a network algorithm for communication via the communication network. This is advantageous in that data can be taken into consideration when generating the communication profile, which data can be assigned to a plurality of subscriber identity modules. The file system can comprise a Service Provider Name (SPN), a Public Land Mobile Network (PLMN) selector, an Service Profile Identifier (SPID) and/or a Group Identifier (GID), for example.

According to one embodiment, the communication interface is configured to receive a property indicator from the subscriber identity module, the property indicator indicating an embedded property of the subscriber identity module, and the processor being configured to further generate the communication profile on the basis of the embedded property of the subscriber identity module. This is advantageous in that a property of a hardware component can be taken into consideration when generating the communication profile. The embedded property can be an available storage space of the subscriber identity module, for example, or the ability of the subscriber identity module to communicate, for example the ability to communicate via Near-Field Communication (NFC).

According to one embodiment, the identification received is a subscriber identity identification that is assigned to the subscriber identity module. This is advantageous in that an electronic identification of the subscriber identity module can be used to call up the subscription. The subscriber identity identification can be an EID (eUICC Identification).

According to one embodiment, the identification received is a token that is assigned to the subscriber identity module. This is advantageous in that a token that has been generated can be used to call up the subscription. The token can be formed by a character string, in particular a sequence of digits.

According to one embodiment, the communication interface is configured to receive a provision signal from a network entity, the provision signal received comprising a subscription comprising an identification, the subscription being assigned to the identification, and the communication interface being configured both to extract the subscription comprising the identification from the provision signal received and to store the extracted subscription comprising the extracted identification in the database. This is advantageous in that subscriptions comprising identifications can be efficiently provided. Furthermore, the database can be efficiently updated.

According to a second aspect, the invention relates to a network entity for communicating with a profile server. The network entity comprises a database, in which a plurality of subscriptions are stored, each subscription comprising subscription data for generating a communication profile, and each subscription being assigned to a subscription type. The network entity further comprises a processor, which is configured to select a subscription from the plurality of subscriptions, the subscription selected being assigned to an identification. The processor is also configured to generate a provision signal, the provision signal comprising the selected subscription that comprises the identification. The network entity also comprises a communication interface, which is configured to send the provision signal to the profile server. This is advantageous in that providing a communication profile for a subscriber identity module can be achieved in an efficient and flexible manner. The network entity can be assigned to a network operator of a communication network. The network entity can be a server. The plurality of subscriptions can be generated in batches and pre-stored in the database. The database can therefore form a subscription store.

According to one embodiment, the communication interface is configured to receive a subscription type indicator, the subscription type indicator indicating a subscription type, the processor being configured to extract the subscription type from the subscription type indicator, and to select the subscription from the plurality of subscriptions on the basis of the subscription type extracted, the subscription selected corresponding to the subscription type extracted.

This is advantageous in that the subscription can be efficiently selected. The subscription type extracted can be assigned to the identification.

According to one embodiment, the processor is configured to select the subscription from the plurality of subscriptions on the basis of a pre-determined subscription type, the selected subscription corresponding to the pre-determined subscription type. This is advantageous in that the subscription can be efficiently selected. The pre-determined subscription type can be pre-stored in the database of the network entity, for example. The pre-determined subscription type can be assigned to the identification.

According to one embodiment, the identification is a subscriber identity identification, the communication interface being configured to receive the subscriber identity identification. This is advantageous in that an electronic identification of a subscriber identity module can be used.

According to one embodiment, the identification is a token, the processor being configured to generate the token. This is advantageous in that an internally generated token can be used.

According to one embodiment, the identification is a token, the communication interface being configured to receive the token. This is advantageous in that the token can be externally generated.

According to one embodiment, the subscription type indicates a range of values, in particular a lower limit and an upper limit, for subscription data, in particular for an International Mobile Subscriber Identity (IMSI), an authentication key (Ki), or an Integrated Circuit Card Identifier (ICCID). This is advantageous in that the subscription can be efficiently selected from the database.

According to one embodiment, profile data for generating a communication profile are also assigned to each subscription, each subscription being assigned to a profile type. This is advantageous in that the communication profile can be efficiently generated. The profile type can indicate a class for the respective profile data, for example "prepaid" or "postpaid".

According to one embodiment, the processor is configured to select the profile server from a plurality of profile servers on the basis of the profile type of the subscription selected. This is advantageous in that dedicated profile servers for various profile types can be used to generate a communication profile.

According to one embodiment, the processor is also configured to select the profile server from the plurality of profile servers on the basis of the subscription type of the subscription selected. This is advantageous in that dedicated profile servers for various subscription types can also be used to generate a communication profile.

According to one embodiment, the processor is configured to determine a network address for the profile server, and to generate an activation code, the activation code indicating the network address and the identification, in particular the token. This is advantageous in that, after inputting the activation code, a user can efficiently call up a communication profile from the profile server. The activation code can be represented by a QR code or a barcode, for example.

According to a third aspect, the invention relates to a subnetwork of a communication network that comprises a plurality of subnetworks. The subnetwork comprises a profile server according to the first aspect of the invention, and a network entity according to the second aspect of the invention. This is advantageous in that providing a communication profile for a subscriber identity module can be achieved in an efficient and flexible manner. The profile server and the network entity can form a communication system for providing a communication profile for communication via the communication network.

According to one embodiment, the subnetwork further comprises a subscriber identity module. This is advantageous in that a communication profile can be efficiently provided for the subscriber identity module.

According to one embodiment, the communication network is a fifth generation (5G) communication network or a communication network of another generation, the subnetwork being a slice of the communication network. This is advantageous in that the communication profile can be efficiently provided.

According to a fourth aspect, the invention relates to a method for providing a communication profile for communication via a communication network using a profile server, the communication profile being assigned to a subscriber identity module. The profile server comprises a database, a communication interface and a processor. A plurality of subscriptions comprising a plurality of identifications are stored in the database, an identification being assigned to each subscription, and each subscription comprising subscription data for generating a communication profile. The method comprises receiving an identification from the subscriber identity module via the communication interface, calling up a subscription from the database via the processor, which subscription is assigned to the identification received, extracting, via the processor, subscription data from the subscription called up, generating the communication profile on the basis of the subscription data extracted via the processor, and sending the communication profile generated to the subscriber identity module via the communication interface in order to provide the communication profile for communication via the communication network. This is advantageous in that providing a communication profile for a subscriber identity module can be achieved in an efficient and flexible manner.

The method can be carried out by the profile server. Additional features of the method directly result from the features and/or the functionality of the profile server.

According to a fifth aspect, the invention relates to a method for communicating with a profile server using a network entity. The network entity comprises a database, a processor and a communication interface. A plurality of subscriptions are stored in the database, each subscription comprising subscription data for generating a communication profile, and each subscription being assigned to a subscription type. The method comprises selecting a subscription from the plurality of subscriptions via the processor, the subscription selected being assigned to an identification, generating a provision signal via the processor, the provision signal comprising the selected subscription that comprises the identification, and sending the provision signal to the profile server via the communication interface. This is advantageous in that providing a communication profile for a subscriber identity module in an efficient and flexible manner.

The method can be carried out by the network entity. Additional features of the method directly result from the features and/or the functionality of the network entity.

According to a sixth aspect, the invention relates to a computer program comprising a program code for carrying out the method according to the fourth aspect of the invention or the method according to the fifth aspect of the invention. This is advantageous in that the methods can be carried out efficiently.

The profile server and/or the network entity can be programmed to carry out the program code or parts of the program code.

The invention can be implemented in hardware and/or in software.

FIG. 1 is a schematic diagram of a profile server 100 for providing a communication profile for communication via a communication network, the communication profile being assigned to a subscriber identity module.

The profile server 100 comprises a database 101, in which a plurality of subscriptions comprising a plurality of identifications are stored, an identification being assigned to each subscription, and each subscription comprising subscription data for generating a communication profile. The profile server 100 further comprises a communication interface 103, which is configured to receive an identification from the subscriber identity module. The profile server 100 also comprises a processor 105, which is configured to call up a subscription from the database 101, which subscription is assigned to the identification received, to extract subscription data from the subscription called up, and to generate the communication profile on the basis of the subscription data extracted. The communication interface 103 is also configured to send the communication profile generated to the subscriber identity module in order to provide the communication profile for communication via the communication network.

Figure 2:
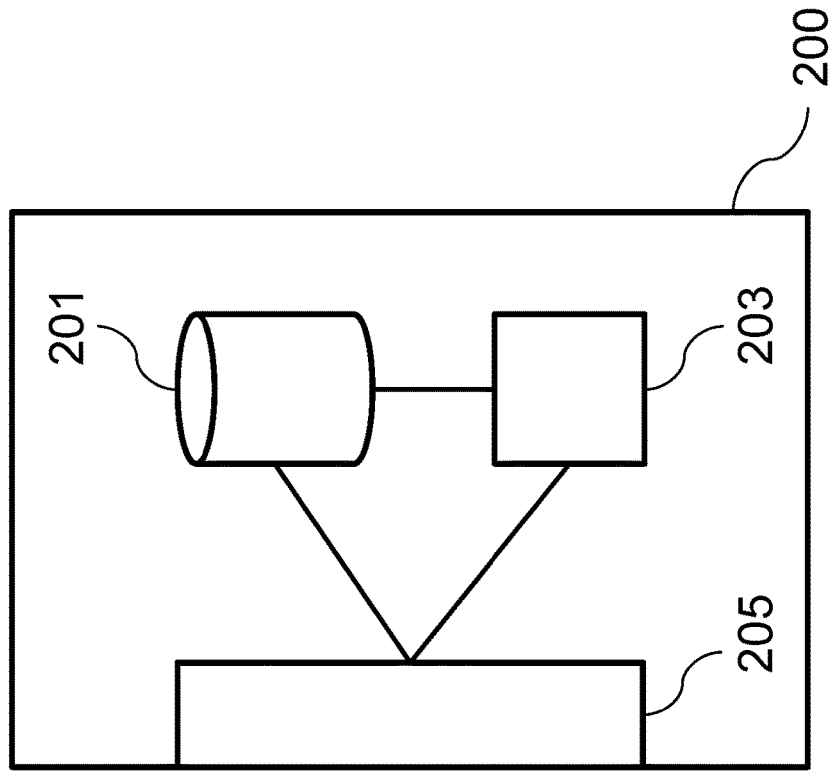
FIG. 2 is a schematic diagram of a network entity for communicating with a profile server.

FIG. 2 is a schematic diagram of a network entity 200 for communicating with a profile server.

The network entity 200 comprises a database 201, in which a plurality of subscriptions are stored, each subscription comprising subscription data for generating a communication profile, and each subscription being assigned to a subscription type. The network entity 200 further comprises a processor 203, which is configured to select a subscription from the plurality of subscriptions, the subscription selected being assigned to an identification. The processor 203 is also configured to generate a provision signal, the provision signal comprising the selected subscription that comprises the identification. The network entity 200 also comprises a communication interface 205, which is configured to send the provision signal to the profile server.

Figure 3:
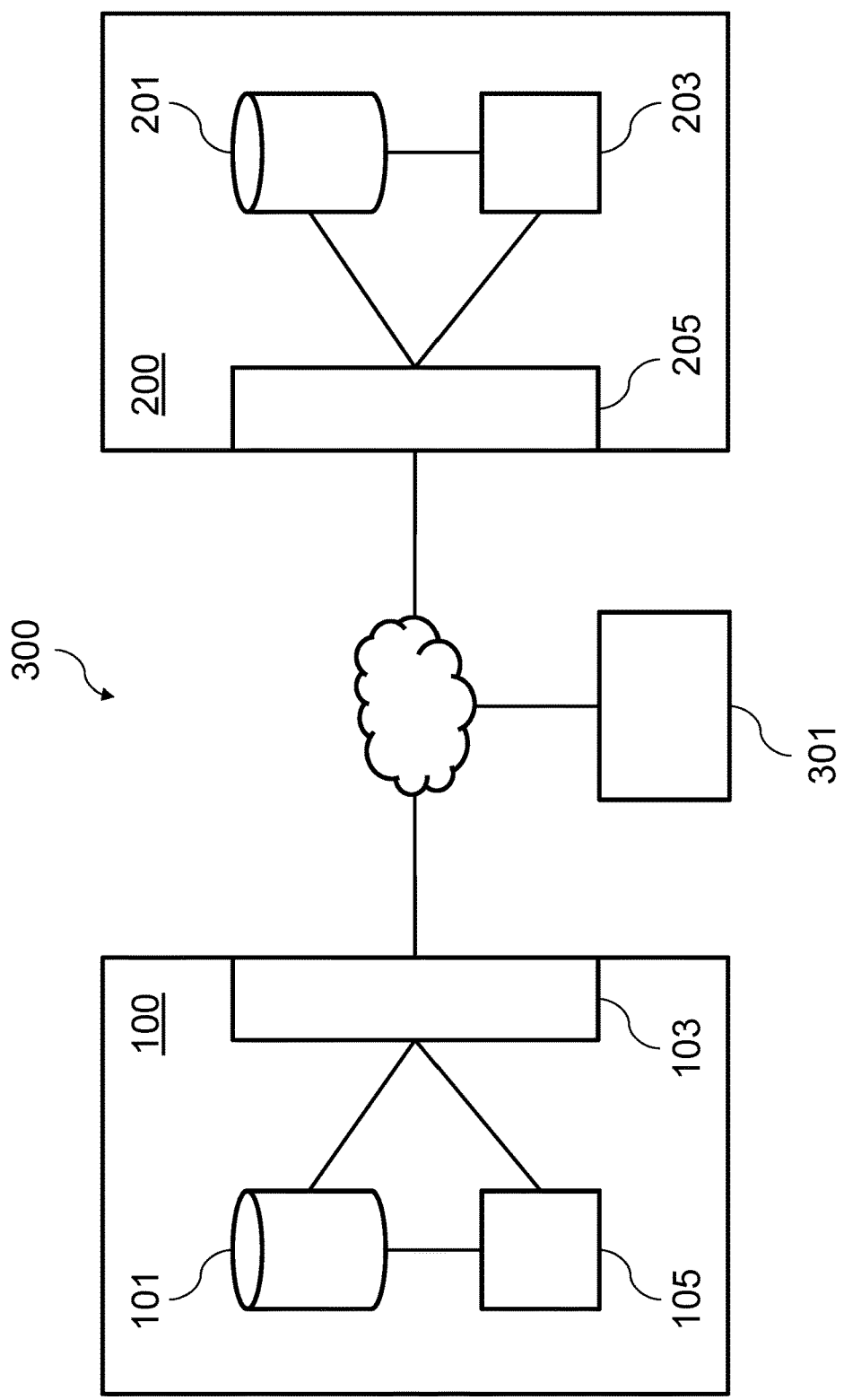
FIG. 3 is a schematic diagram of a subnetwork of a communication network that comprises a plurality of subnetworks.

FIG. 3 is a schematic diagram of a subnetwork 300 of a communication network that comprises a plurality of subnetworks. The subnetwork 300 comprises a profile server 100 and a network entity 200. The subnetwork 300 also comprises a subscriber identity module 301.

The profile server 100 is used to provide a communication profile for communication via a communication network, the communication profile being assigned to the subscriber identity module 301. The profile server 100 comprises a database 101, in which a plurality of subscriptions comprising a plurality of identifications are stored, an identification being assigned to each subscription, and each subscription comprising subscription data for generating a communication profile. The profile server 100 further comprises a communication interface 103, which is configured to receive an identification from the subscriber identity module 301. The profile server 100 also comprises a processor 105, which is configured to call up a subscription from the database 101, which subscription is assigned to the identification received, to extract subscription data from the subscription called up, and to generate the communication profile on the basis of the subscription data extracted. The communication interface 103 is further configured to send the communication profile generated to the subscriber identity module 301 in order to provide the communication profile for communication via the communication network.

The network entity 200 comprises a database 201, in which a plurality of subscriptions are stored, each subscription comprising subscription data for generating a communication profile, and each subscription being assigned to a subscription type. The network entity 200 further comprises a processor 203, which is configured to select a subscription from the plurality of subscriptions, the subscription selected being assigned to an identification. The processor 203 is also configured to generate the provision signal, the provision signal comprising the selected subscription comprising the identification. The network entity 200 also comprises a communication interface 205, which is configured to send the provision signal to the profile server 100. The profile server 100 can be configured to receive the provision signal from the network entity 200. As a result, subscriptions comprising identifications can be efficiently made available in the database 101. The database 101 can also be efficiently updated.

This makes it possible to generate and pre-store or store a plurality of subscriptions in batches, and to only generate a communication profile just-in-time (JIT) after the subscriber identity module 301 has started downloading the communication profile.

By using the procedure, the advantages of generating communication profiles just-in-time (JIT) by subscriber identity modules can be used even when the communication profiles are created in batches. In this case, subscription types can be used.

The following definitions are used to describe the procedure:

Subscription:
Subscription data used to create a communication profile in a communication network.
Examples: for the HLR: IMSI/Ki; for accounting systems: ICCID or IMSI, optionally MSISDN (Mobile Station International Subscriber Directory Number).

Subscription type (or "subs type"):
Determines in which range of values a subscription or subscription data lies, for example.
Example: for specific applications, the IMSIs are in a particular range of values.
Example: various ICCID ranges of values can be provided for prepaid and postpaid.

Embedded properties ("eProps"):
Properties of a communication profile that are dependent on properties of a subscriber identity module and/or a communication device.
Example: profile size, which can be dependent on the free storage space of a subscriber identity module, for example.
Example: NFC ability, which can be dependent on the NFC ability of a subscriber identity module and/or a communication device.

It may be that the embedded properties ("eProps") cannot be deduced from a subscriber identity identification.

Profile type:
Determines properties, which are product-related properties for example, such as postpaid or prepaid, of a specific service provider, but are not dependent on the subscription and therefore on the subscription type. A network operator ("mobile network operator", MNO) can determine these properties without knowing the properties of a specific target subscriber identity module.

Examples: applications of a subscriber identity module, a file system for a subscriber identity module, SPN, SPID, GID, PLMN selector, network algorithm.

A profile type can have various characteristics, which can be dependent on the subscriber identity module and can thus have various embedded properties ("eProps").

For example, a profile type for "postpaid" can have the following characteristics:
"large" with "several" applications and a "large" telephone directory for "large" subscriber identity modules;
"small" with "few" applications and a "small" telephone directory for "small" subscriber identity modules.

The telephone directory can be represented by Abbreviated Dialing Numbers (ADNs).

Subscription store:
Virtual store for the communication profiles produced.
Profile server or profile provisioner (PP):
Can correspond to an SMDP+server according to the GSMA (Groupe Spéciale Mobile Association) standard. Can also generate a communication profile and transfer it to a subscriber identity module.
Network Operator ("mobile network operator", MNO):
In the following, this also refers to the systems operated by the network operator, for example the network entity 200, which can implement and carry out the procedures described.

The following properties can therefore be used to generate a communication profile:
Profile type;
Embedded properties ("eProps") correlating with the characteristic;
Subscription of a particular subscription type;
Individual data, except for the subscription data, which can be generated just in time (JIT), for example PINS, PUKs, ACCs (Access Control Classes), OTA keys, keys for applications, etc.

Subscriptions can be generated and created in the following way:
The network operator defines a plurality of subscription types, which can be dependent on their communication profile product portfolio. Examples thereof are ranges of values for IMSIs or ranges of values for ICCIDs.

The network operator ensures that a sufficiently high number of subscriptions are created in the systems of the network operator, in particular in accounting systems and in the HLR, at any time. Said subscriptions can be created in batches, for example, and can also be considered to be the production of subscriptions for a virtual warehouse. Calling up a communication profile via a subscriber identity module and/or unlocking a subscription corresponds to the extraction thereof from the virtual warehouse.

Generating and calling up a communication profile ("profile download") via a subscriber identify module can be carried out using two different procedures, for example: Operator Push (OP) or Activation Code (AC). The generation of communication profiles just-in-time will be described in the following for these two procedures.

Operator Push (OP):
Here, a customer of a network operator has selected a product from the portfolio of the network operator and makes the subscriber identity identification of the subscriber identity module available to the network operator, on which module a communication profile is intended to be loaded. The subscriber identity identification can be an eUICCID (EID). The procedure is then carried out as follows:

Step OP1:
The network operator selects a profile type and a subscription type ("subs type") which match the selected product.

Examples:
For an "eSIM Postpaid" product: a "postpaid" profile type comprising postpaid telephone directories (Abbreviated Dialing Numbers (ADNs), Fixed Dialing Numbers (FDNs), Service Dialing Numbers (SDNs)) as profile data and a subscription type comprising a range of ICCID values for postpaid communication profiles.
For an "eSIM Service Provider X" product: a "Service Provider X" profile type, the profile data containing a specific service provider name (SPN) and telephone directories for "Service Provider X", as well as a subscription type comprising a range of IMSI values specific to Service Provider X.

Step OP2:
The network operator extracts a subscription of the selected subscription type from the subscription store. The subscription store can comprise the database 201, for example.

Step OP3:
The network operator selects a profile server 100 or profile provisioner (PP), which is able to generate a communication profile on the basis of the profile type and the subscription type, the selection being dependent in particular on the profile type, and forwards the profile data of a specific profile type, the subscription comprising the subscription data and the subscriber identity identification to the profile server 100. The profile server 100 can store these data in the database 101, for example.

Step OP4:
As soon as a communication device comprising the subscriber identity module 301 that comprises the subscriber identity identification connects to the profile server 100 in order to call up a communication profile, the subscriber identity module 301 sends the following to the profile server 100:
the subscriber identity identification; and
specific data relating to the subscriber identity module 301 or to the communication device, which are relevant to the embedded properties ("eProps"), for example the free storage space of the subscriber identity module 301, and the NFC ability of the subscriber identity module 301 or the communication device. Furthermore, additional data can be sent, for example data of a cryptographic nature, which are used to link a communication profile to the subscriber identity identification. This can be carried out using standard procedures, for example.

Step OP5:
The profile server 100 extracts profile data of a profile type and the subscription comprising the subscription data from its database 101 in order to identity the subscriber identity. If several characteristics of a profile type are present, the profile server 100 selects a characteristic comprising embedded properties ("eProps"), which are compatible with the subscriber identity module 301, for example, for a subscriber identity module 301 having a small amount of free storage space, said server selects a characteristic comprising embedded properties for a small amount of storage space.

Step OP6:
The profile server 100 generates a communication profile on the basis of the profile data of the stated profile type, the embedded properties of the characteristic and the subscription comprising the subscription data, and provides this communication profile such that it can be called up by the subscriber identity module 301.

Step OP7:

The communication profile can be loaded on the subscriber identity module 301 comprising the subscriber identity identification or on the communication device.

Activation code (AC):

Here, a customer has selected a product from the portfolio of a network operator. The procedure is then carried out as follows:

Step AC1:

Similar to step OP1.

Step AC2:

Similar to step OP2.

Step AC3:

The network operator selects a profile server 100, which is able to generate a communication profile comprising profile data of a profile type and subscription data of a subscription type, it being possible for the selection to depend on the profile type in particular.

Step AC4:

The network operator generates an activation code (AC) either by itself or by third parties, which indicates a unique token and a network address, for example a URL (Uniform Resource Locator), of the profile server 100.

Step AC5:

The network operator sends profile data of a profile type, the subscription comprising the subscription data and the token to the profile server 100. The profile server 100 stores this data in the database 101.

Step AC6:

The network operator forwards the activation code to the customers, for example in the form of a QR code.

Step AC7:

The customer enters the activation code into the communication device using the subscriber identity module 301, for example by scanning the QR code.

Step AC8:

This step is carried out in a similar way to step OP4.

The subscriber identity module 301 or the communication device extracts the token and the network address of the profile server 100 from the activation code and sends the following to the profile server 100:

the token; and specific data relating to the subscriber identity module 301 or to the communication device, which data are relevant to the embedded properties ("eProps"), for example the free storage space of the subscriber identity module 301, and the NFC ability of the subscriber identity module 301 or of the communication device.

Furthermore, additional data can be sent, for example data of a cryptographic nature, which are used to link a communication profile to the subscriber identity identification. This can be carried out using standard procedures, for example.

Step AC9:

This step is carried out in a similar way to step OP5.

The profile server 100 extracts from its database 101 both profile data of a profile type and the subscription comprising the subscription data for the token. If several characteristics of a profile type are available, the profile server 100 selects a characteristic having embedded properties ("eProps") that are compatible with the subscriber identity module 301, for example, for a subscriber identity module 301 having a small amount of free storage space, said server selects a characteristic having embedded properties for a small amount of storage space.

Step AC10:

This step is carried out in a similar way to step OP6.

Step AC11:

This step is carried out in a similar way to step OP7.

The subscriptions can likewise be created in the back-end systems of the network operator just in time (JIT).

Figure 4:
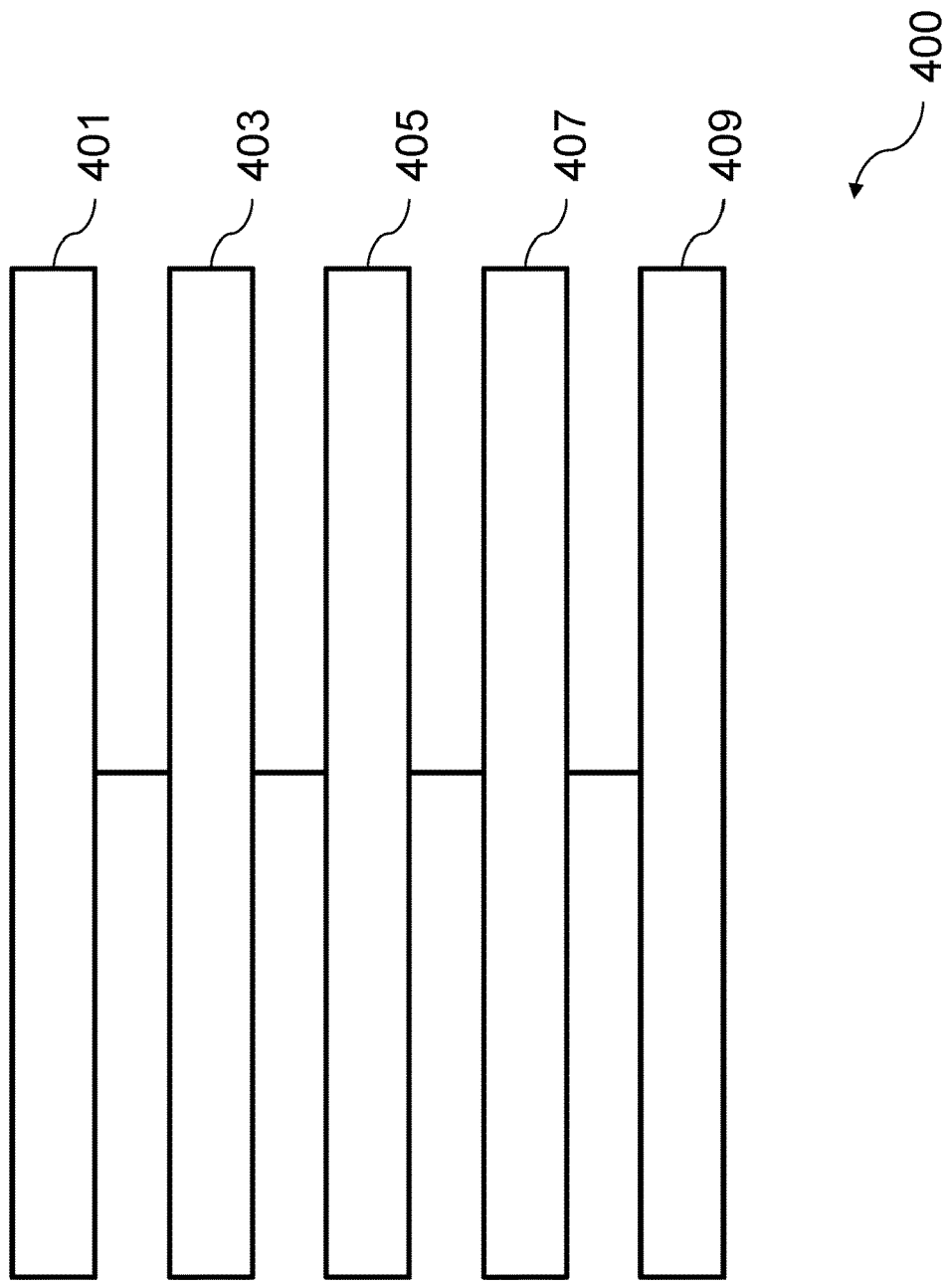
FIG. 4 is a schematic diagram of a method for providing a communication profile for communication via a communication network using a profile server.

FIG. 4 shows a schematic diagram of a method 400 for providing a communication profile for communication via a communication network using a profile server, the communication profile being assigned to a subscriber identity module.

The profile server comprises a database, a communication interface and a processor. A plurality of subscriptions comprising a plurality of identifications are stored in the database, an identification being assigned to each subscription, and each subscription comprising subscription data for generating a communication profile.

The method 400 comprises receiving 401 an identification from the subscriber identity module via the communication interface, calling up 403 a subscription from the database via the processor, which subscription is assigned to the identification received, extracting 405, via the processor, subscription data from the subscription called up, generating 407 the communication profile on the basis of the extracted subscription data via the processor, and sending 409 the communication profile generated to the subscriber identity module via the communication interface in order to provide the communication profile for communication via the communication network.

Figure 5:
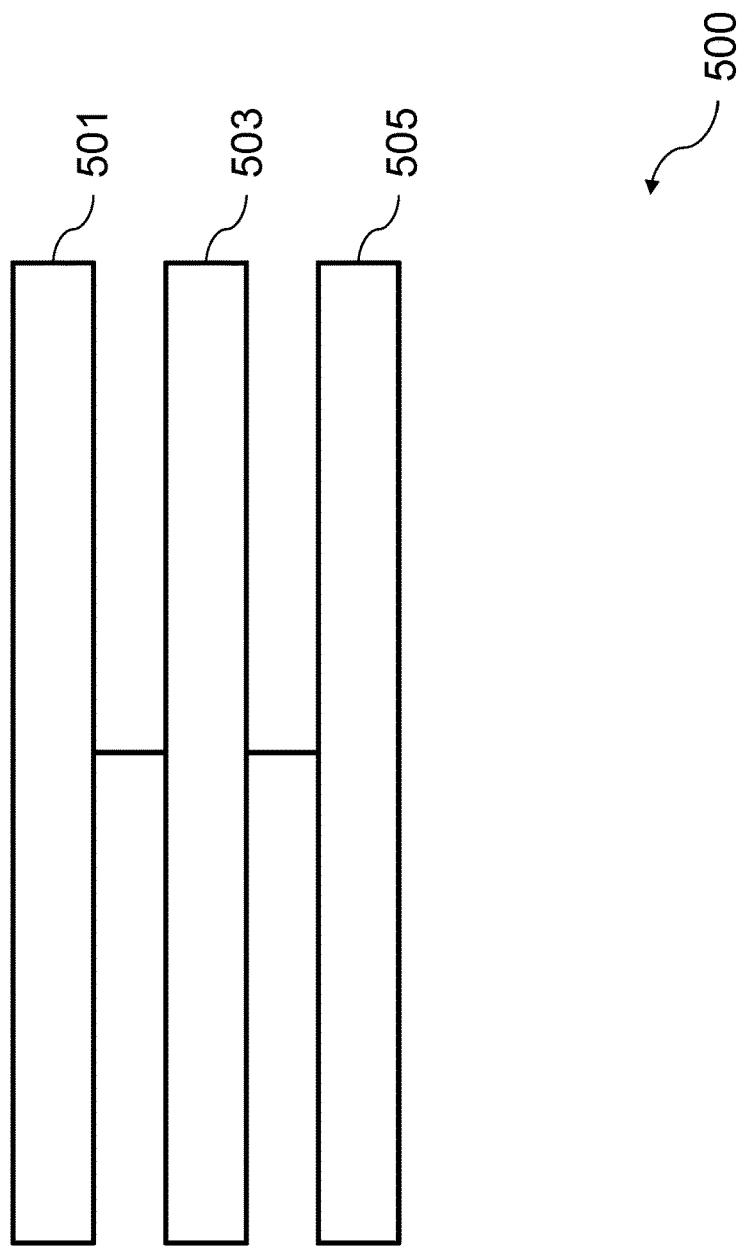
FIG. 5 is a schematic diagram of a method for communicating with a profile server using a network entity.

FIG. 5 shows a schematic diagram of a method 500 for communicating with a profile server using a network entity.

The network entity comprises a database, a processor and a communication interface. A plurality of subscriptions are stored in the database, each subscription comprising subscription data for generating a communication profile, and each subscription being assigned to a subscription type.

The method 500 comprises selecting 501 a subscription from the plurality of subscriptions via the processor, the subscription selected being assigned to an identification, generating 503 a provision signal via the processor, the provision signal comprising the selected subscription that comprises the identification, and sending 505 the provision signal to the profile server via the communication interface.

All the features shown and described in association with individual embodiments can be provided in different combinations within the subject matter of the invention so as to simultaneously provide the advantageous effects of said features.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 profile server
101 database
103 communication interface
105 processor
200 network entity
201 database
203 processor
205 communication interface
300 subnetwork
301 subscriber identity module
400 method for providing a communication profile
401 receiving
403 calling up
405 extracting
407 generating
409 sending
500 method for communicating with a profile server
501 selecting
503 generating
505 sending

The invention claimed is:

1. A profile server for providing a communication profile for communication via a communication network, wherein the communication profile is assigned to a subscriber identity module, the profile server comprising:
   a database, configured to store a plurality of subscriptions comprising a plurality of identifications, wherein a respective identification is assigned to each subscription, and wherein each subscription comprises subscription data for generating a communication profile;
   a communication interface, configured to receive an identification from the subscriber identity module; and
   a processor, configured to call up a subscription from the database, wherein the subscription is assigned to the received identification, to extract subscription data from the called up subscription, and to generate the communication profile based on the extracted subscription data;
   wherein the communication interface is further configured to send the generated communication profile to the subscriber identity module in order to provide the communication profile for communication via the communication network;
   wherein the communication interface is further configured to receive a provision signal from a network entity, wherein the received provision signal comprises a subscription comprising an identification, wherein the subscription is assigned to the identification, and wherein the communication interface is further configured to extract the subscription comprising the identification from the received provision signal and to store the extracted subscription comprising the extracted identification in the database.

2. The profile server according to claim 1, wherein the subscription data comprises: an International Mobile Subscriber Identity (IMSI), an authentication key (Ki), or an Integrated Circuit Card Identifier (ICCID).

3. The profile server according to claim 1, wherein profile data for generating a communication profile is also assigned to each subscription, and wherein the processor is further configured to generate the communication profile based on the profile data assigned to the called up subscription.

4. The profile server according to claim 3, wherein the profile data comprises: a software application of the subscriber identity module, information relating to a software application of the subscriber identity module, a software code, a file system for the subscriber identity module, or information relating to a network algorithm for communication via the communication network.

5. The profile server according to claim 1, wherein the received identification is a subscriber identity identification or a token that is assigned to the subscriber identity module.

6. A network entity for communicating with a profile server, the network entity comprising:
   a database, configured to store a plurality of subscriptions, wherein each subscription comprises subscription data for generating a communication profile, and wherein each subscription is assigned to a subscription type;
   a processor, configured to select a subscription from the plurality of subscriptions, wherein the subscription selected comprises an identification, and wherein the processor is further configured to generate a provision signal, wherein the provision signal comprises the selected subscription that comprises the identification; and
   a communication interface, configured to send the provision signal to the profile server.

7. The network entity according to claim 6, wherein the identification is a subscriber identity identification, and wherein the communication interface is configured to receive the subscriber identity identification.

8. The network entity according to claim 6, wherein the identification is a token, and wherein the processor is configured to generate the token.

9. The network entity according to claim 6, wherein the subscription type indicates a range of values, including a lower limit and an upper limit, for subscription data, wherein the subscription data includes an International Mobile Subscriber Identity (IMSI), an authentication key (Ki), or an Integrated Circuit Card Identifier (ICCID).

10. The network entity according to claim 6, wherein profile data for generating a communication profile is also assigned to each subscription, and wherein each subscription is assigned to a profile type.

11. The network entity according to claim 10, wherein the processor is configured to select the profile server from a plurality of profile servers based on the profile type of the subscription selected.

12. A method for providing a communication profile for communication via a communication network using a profile server, wherein the communication profile is assigned to a subscriber identity module, wherein the profile server comprises a database, a communication interface and a processor, wherein a plurality of subscriptions comprising a plurality of identifications are stored in the database, wherein a respective identification is assigned to each subscription, and wherein each subscription comprises subscription data for generating a communication profile, wherein the method comprises:

receiving a provision signal from a network entity, wherein the received provision signal comprises a subscription comprising an identification, wherein the subscription is assigned to the identification;

extracting the subscription comprising the identification from the received provision signal and storing the extracted subscription comprising the extracted identification in the database;

receiving an identification from the subscriber identity module via the communication interface;

calling up, by the processor, a subscription from the database via the processor, wherein the subscription is assigned to the identification received;

extracting, by the processor, subscription data from the called up subscription;

generating, by the processor, the communication profile based on the extracted subscription data; and sending the generated communication profile to the subscriber identity module via the communication interface in order to provide the communication profile for communication via the communication network.

13. A method for communicating with a profile server using a network entity, wherein the network entity comprises a database, a processor and a communication interface, wherein a plurality of subscriptions are stored in the database, wherein each subscription comprises subscription data for generating a communication profile, and wherein each subscription is assigned to a subscription type, wherein the method comprises:

selecting, by the processor, a subscription from the plurality of subscriptions, wherein the selected subscription comprises an identification;

generating, by the processor, a provision signal, wherein the provision signal comprises the selected subscription that comprises the identification; and sending the provision signal to the profile server via the communication interface.

* * * * *